(12) United States Patent
Deenadhayalan et al.

(10) Patent No.: US 8,006,126 B2
(45) Date of Patent: Aug. 23, 2011

(54) DATA INTEGRITY VALIDATION IN STORAGE SYSTEMS

(75) Inventors: Veera W. Deenadhayalan, San Jose, CA (US); James L. Hafner, San Jose, CA (US); James C. Wyllie, Monte Sereno, CA (US); Wendy A. Belluomini, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/777,446

(22) Filed: May 11, 2010

(65) Prior Publication Data

US 2010/0217752 A1 Aug. 26, 2010

Related U.S. Application Data

(63) Continuation of application No. 11/747,188, filed on May 10, 2007, now Pat. No. 7,752,489.

(51) Int. Cl.
*G06F 11/00* (2006.01)
(52) U.S. Cl. .......................... 714/6.1; 714/6.24; 714/807
(58) Field of Classification Search ........................ None
See application file for complete search history.

(56) References Cited

U.S. PATENT DOCUMENTS

| 6,480,970 | B1 | 11/2002 | DeKoning et al. |
| 7,073,024 | B1 | 7/2006 | Chilton |
| 2003/0145270 | A1 | 7/2003 | Holt |
| 2004/0123032 | A1 | 6/2004 | Talagala et al. |
| 2004/0153746 | A1 | 8/2004 | Talagala et al. |
| 2006/0080505 | A1 | 4/2006 | Arai et al. |
| 2006/0109792 | A1 | 5/2006 | Broadbent et al. |
| 2006/0179381 | A1 | 8/2006 | Durica et al. |
| 2006/0200497 | A1 | 9/2006 | Hu et al. |
| 2006/0242540 | A1 | 10/2006 | Cherian et al. |
| 2006/0248378 | A1 | 11/2006 | Grcanac et al. |

OTHER PUBLICATIONS

Blaum et al. Evenodd: An Efficient Scheme for Tolerating Double Disk Failures in RAID Architectures. IEEE Transactions on Computers, Feb. 1995. vol. 44, No. 2, pp. 192-202.
Jing et al. A Fast Error and Erasure Correction Algorithm for a Simple RS-RAID. Info-Tech and Info-Net, 2001. vol. 3, pp. 333-338. Beijing, China.
Paxton. A Client-Based Transaction System to Maintain Data Integrity. ACM Symposium on Operating Systems Principles, 1979. pp. 18-23. Pacific Grove, CA, United States.
International Searching Authority. International Search Report and Written Opinion for International Application No. PCT/EP2008/055361, Apr. 1, 2009.

*Primary Examiner* — Marc Duncan
(74) *Attorney, Agent, or Firm* — Century IP Group, Inc.; F. Jason Per-hadian, Esq.

(57) ABSTRACT

Data validation systems and methods are provided. Data is recorded in N data chunks on one or more storage mediums. A first validation chunk independently associated with said N data chunks comprises first validation information for verifying accuracy of data recorded in said N data chunks. The first validation chunk is associated with a first validation appendix comprising second validation information, wherein the first validation appendix is stored on a first storage medium independent of said one or more storage mediums.

30 Claims, 10 Drawing Sheets

DATA INTEGRITY VALIDATION IN STORAGE SYSTEMS

CROSS-REFERENCE TO RELATED APPLICATIONS

Pursuant to 35 U.S.C. 120, this application is a continuation of U.S. application Ser. No. 11/747,188, filed on May 10, 2007, the contents of which are incorporated by reference herein in their entirety.

COPYRIGHT & TRADEMARK NOTICES

A portion of the disclosure of this patent document comprises material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is for providing an enabling disclosure by way of example and shall not be construed to limit the scope of this invention to material associated with such marks.

FIELD OF INVENTION

The present invention relates generally to fault tolerant data storage systems and, more particularly, to a data recovery system and method in a data storage network.

BACKGROUND

Disk drives are designed to store and retrieve data. With increasing capacities and higher densities, disk drives are becoming less reliable in performing these functions.

Three disk behaviors contribute to corruption of data stored on a disk drive. During a write, the disk arm and head must align with very accurate precision on the track that comprises the physical block in order to deposit the new "bits" of write data. In the case of a write, two tracking errors can occur. Either the head can be misaligned so badly that the data is written to a completely unintended track or the head may be misaligned so that the data falls in a gap between two adjacent tracks.

In the former case, called a Far Off-track Write, two physical blocks are placed in error because the target block is not overwritten and so comprises stale data and the overwritten block has lost the data that should be there. In the latter case, called a Near Off-track Write, one block is placed in error because the target block is not overwritten.

A second type of error that also occurs during a write happens when the bits are not changed on the disk, for example, if the preamp signal is too weak to change the magnetic setting of the bits on the platter. In this case, the data remaining on the platter is stale (i.e., the data is not up-to-date with the write commands issued to the drive). These errors are called dropped writes because the bits are not recorded on the platter.

Both of the above-mentioned types of write errors are called "Undetected Write Errors" because the disk drops the write data in the wrong location and does not itself detect the problem. In the literature, the terms "dropped write" or "phantom write" are sometimes used to describe some or all of these situations.

A third type of error is a misaligned head placement when reading data. In this case, the disk may read the data bits from a completely unintended track (i.e., Far Off-track Read) or from a gap between two tracks (i.e., Near Off-track Read) and return incorrect data to the user or application. Both of these errors are typically transient and are corrected when a subsequent read occurs to the same track. In addition, if the read tracks correctly but on the unintended target of a Far Off-track Write, incorrect data will be returned to the user or application.

In all the above scenarios, the drive typically does not detect a problem and returns a successful status notice to the user, host or application. Other error scenarios may also occur where the disk returns a success status while the user or application gets incorrect data. Such write or read errors can be referred to as Undetected Disk Error (UDE). Because a disk drive cannot independently detect UDEs, other methods need to be provided to detect such errors. Two main solution classes are available in the related art for verifying the accuracy of data read or written to disk drives.

The first class is the file system or the application layer. For example, some file systems and many database systems use checksums on data chunks (e.g., 4KB chunks) which are stored separate from the data chunks themselves. The checksums are read along with the data chunks; new checksums are recomputed from the read data chunks and are compared with the checksums read along with the data chunks. If the new checksum matches the old ones, then the read data chunk is assumed to be correct.

The above method has two fundamental limitations. First, said method typically cannot recover from detected errors, unless they are also integrated with some additional data redundancy such as redundant array of independent disk drives (RAID). Second, said method is not always the source for every disk read, and so checking may not occur as often as necessary.

RAID is a disk subsystem that is used to increase performance and/or provide fault tolerance. RAID architecture comprises a plurality of disk drives and a disk controller (also known as an array controller). RAID improves performance by disk striping, which interleaves bytes or groups of bytes across multiple drives, so more than one disk is reading and writing simultaneously. Fault tolerance is also achieved in a RAID architecture by way of implementing mirroring or parity.

For example, when the source of a disk read is not the filesystem or application layer, an underlying (and logically separate) layer in a RAID architecture may perform reads in the context of an application write (e.g., in a read-modify-write scenario). The application layer does not validate these types of reads. In such a case, the read may extract incorrect data from the disk and then use this incorrect data to update the RAID redundancy data. Thus, an error that goes undetected by the application may propagate errors in the underlying RAID layer, compounding the problem created by the drive.

U.S. Pat. No. 7,020,805, "Efficient Mechanisms for Detecting Phantom Write Errors", US Patent Application 2006/0200497, "Detection and Recovery of Dropped Writes in Storage Devices", and published paper "A Client-based Transaction System to Maintain Data Integrity", by William Paxton, in Proceedings of the seventh ACM symposium on Operating systems principles, 1979, pp 18-23 provide examples of such systems.

A second class of methods to detect UDEs are implemented in the storage system itself, at a layer that is closer to the hardware layer so that every disk read and write that occurs in the system is monitored, whether the read or write is generated by the application layers or by the storage system layer itself. This class, however, cannot detect errors that occur in system layers that are higher than the storage system (e.g., in the network or internal host busses). It is desirable to have a method that not only detects a problem but also is capable of also locating where the error occurs and further, to correct the errors if possible.

There are a number of subclasses of methods that can be used within the storage system for detection of possible location and correction of UDEs. The first is based on parity scrubbing. RAID systems that protect against disk failures (such as RAID1 or RAID5) may use a method called "parity scrub" to detect these sorts of errors. For example, in a RAID5 system, the process involves reading the data and the respective redundancy data (i.e., parity data), recomputing the parity value and comparing the computed parity value with the parity value read from disk.

If the two parity values do not match then an error has occurred. Unfortunately, RAID5 does not provide a means to locate or correct an error detected in the above manner. More importantly, these parity scrubs may not detect errors that have been masked by other operations that were applied to data between the occurrence of a UDE and the parity scrub operation.

For example, a UDE may occur during a write to a first disk in a RAID5 array that comprises four data disks and one parity disk. Subsequently, a write may be issued to the array for the second, third and fourth disks. Typically, an array will promote this operation to a full write by reading the data from the first disk computing parity and writing out the new data to second, third and fourth disks and to the parity disk. After this operation, the data on the first disk is still incorrect, but the parity is now consistent with all the data (i.e., the parity now comprises the bad data on the first disk). As a result, a subsequent parity scrub will not detect the bad data.

Another example of error propagation can occur when, subsequent to a UDE, a successful and correct write (using a read-modify-write methodology) occurs to the same location. This will leave the parity corrupted with the effects of the bad data. In effect, the bad data moves from the disk with the UDE to the parity disk. These migration effects can occur whenever the bad data is read from the disk in order to perform any write operation to the stripe.

Similar and even more complicated scenarios occur even with higher fault tolerant RAID algorithms such as RAID6. RAID6 is a fault tolerant data storage architecture that can recover from the loss of two storage devices. It achieves this by storing two independent redundancy values for the same set of data. In contrast, RAID5 only stores one redundancy value, the parity.

A parity scrub on a RAID6 array can detect, locate and correct a UDE (assuming no disks have actually failed) but only if no operations were performed on the stripe that may have migrated or hidden the UDE. Parity scrubs are very expensive operations and so are typically done sparingly. Consequently, this conditional assumption that no operations that migrated or failed to detect UDEs occurred before the scrub rarely holds in practice.

A location algorithm in the context of RAID6 (or higher fault tolerance) is disclosed in US Patent Application 2006/0248378, "Lost Writes Detection in a Redundancy Group Based on RAID with Multiple Parity." This location algorithm must be used in conjunction with parity scrubs as an initial detection method. RAID parity scrub methods are incapable of reliably detecting and/or locating and correcting UDEs in an array.

A second subclass of methods for addressing the problem of UDEs within the storage system is based on the write cache within the system. The method described in US Patent Application 2006/0179381, "Detection and Recovery of Dropped Writes in Storage Devices" uses the cache as a holding place for data written to disk. Only after the data is re-read from the disk and verified is the data cleared from the cache. This is an expensive method due to a number of factors.

First, the discussed method requires using valuable cache space that could be used to improve read/write cache performance of the system. Second, it requires a separate read call (at some unspecified time) in order to validate the data on the disk. If that read occurs immediately after the data is written, Off-track Write Errors may not be detected because the head tracking system may not have moved.

If the read occurs when the system needs to clear the cache (e.g., to gain more cache space for another operation), then a pending operation will be delayed until the read and compare occurs. Alternatively, the read could happen at intermediate times, but it will impact system performance with the extra IOs.

A third subclass uses some form of metadata to manage the correctness of the data. The metadata is stored in memory and possibly on separate disks or arrays from the arrays the metadata represents. For example, US Patent Application 2005/0005191 A1, "System and Method for Detecting Write Errors in a Storage Device," discloses a method for UDE detection. A checksum and sequence number for each block in a set of consecutive data blocks is stored in an additional data block appended immediately after. A second copy is stored in memory for the entire collection of blocks on the disk and this copy is periodically flushed to disk (which necessarily is a different disk) and preferably is stored on two disks for fault tolerance.

A related scheme is found in U.S. Pat. No. 6,934,904, "Data Integrity Error Handling in a Redundant Storage Array" where only checksums are used, but no particular rule is defined for the storage of the primary checksum. US Patent Application 2003/0145279, "Method for using CRC as Metadata to Protect Against Drive Anomaly Errors in a Storage Array" discloses a similar checksum algorithm for detection together with a location algorithm.

The above schemes suffer from the problems of high disk overhead and the additional IOs required to manage and preserve the checksum/sequence number data. Other examples of the third subclass are disclosed in U.S. Pat. No. 7,051,155, "Method and System for Striping Data to Accommodate Integrity Metadata."

The fourth subclass of storage based UDE detectors is similar to the third subclass in that the fourth subclass also uses some form of metadata to verify correctness of data read from disk. However, in the fourth subclass, the metadata is kept within the array and is collocated with the data or the parity in the array. For example, U.S. Pat. No. 7,051,155, "Method and System for Striping Data to Accommodate Integrity Metadata" discloses an embodiment where one copy of the stripe metadata is stored within the stripe.

The above scheme provides a significant performance advantage when the system performs a read-modify-write to update data in the stripe. The method described in US Patent Application US2004/0123032, "Method for Storing Integrity Metadata in Redundant Data Layouts" uses extra sectors adjacent to the sectors of the parity strip(s) to store the metadata for the data chunks in the stripe. This method includes use of a generation number on the metadata, stored in NVRAM in order to verify the contents of the metadata.

Other examples of the fourth subclass include the methods applicable to RAID5 arrays that are described in U.S. Pat. No. 4,761,785, "Parity Spreading to Enhance Storage Access;" US Patent Application 2006/0109792 A1,"Apparatus and Method to Check Data Integrity When Handling Data;" and U.S. Pat. No. 7,051,155, "Method and System for Striping Data to Accommodate Integrity Metadata."

The above-mentioned classes and subclasses for detecting and correcting UDEs are either inefficient or ineffective in uncovering sufficient details about a read or write error to help locate and fix a problem in many circumstances. Thus, data recovery methods and systems are needed that can overcome the aforementioned shortcomings

SUMMARY

The present disclosure is directed to a system and corresponding methods that facilitate detecting and correcting undetected disk errors (UDEs) in a data storage system.

For purposes of summarizing, certain aspects, advantages, and novel features of the invention have been described herein. It is to be understood that not all such advantages may be achieved in accordance with any one particular embodiment of the invention. Thus, the invention may be embodied or carried out in a manner that achieves or optimizes one advantage or group of advantages without achieving all advantages as may be taught or suggested herein.

In accordance with one aspect of the invention, a data validation method is provided. Referring to FIGS. 1 through 11, data may be recorded in N data chunks (e.g., S0–S(N–1)) on one or more storage mediums, wherein a first validation chunk (e.g., P) independently associated with said N data chunks comprises first validation information (e.g., checksum, etc.) for verifying accuracy of data recorded in said N data chunks.

In one embodiment, the first validation chunk is associated with a first validation appendix (e.g., P Appendix) comprising second validation information (e.g., metadata), wherein the first validation appendix is stored on a first storage medium independent of said one or more storage mediums. A request for an operation to be performed on first data in a first data chunk from among said N data chunks may be received; and the first validation information may be examined to determine accuracy of the first data. The second validation information may be also examined to further verify the accuracy of the first data.

The examining of the second validation information may comprise determining whether certain data in the first validation information match certain other data in the second validation information. The method may further comprise examining the second validation information to determine a source of error for the first data, in response to determining that the first data is inaccurate based on examining the first validation information; and examining the second validation information to verify accuracy of first validation information, in response to determining that the first data is inaccurate based on examining the first validation information.

In one embodiment, the first validation information may comprise checksum data for at least one data chunk in said N data chunks, and a physical or logical block address for at least one data chunk in said N data chunks. The second validation information comprises sequence numbers that provide ordering information about updates applied to at least one data chunk in said N data chunks. The ordering information comprises timestamps for at least one data chunk in said N data chunks.

In some embodiments, the second validation information may comprise information about creation history of at least one data chunk in said N data chunks, or information about the content of at least one data chunk in said N data chunks. The second validation information may also comprise N sets of metadata (e.g., features 0 to (N–1)) such that each set is respectively associated with one of the N data chunks to provide independent validation information for determining the accuracy of each of the N data chunks, respectively.

In one embodiment, at least one of said N data chunks is associated with a first data appendix that comprises independent validation information for determining the accuracy of data in at least one of the N data chunks. In another embodiment, the independent validation information in the first data appendix associated with the first data chunk provides information for determining the accuracy of data in the first data chunk. In some embodiments, the independent validation information in the first data appendix associated with the first data chunk provides information for determining the accuracy of data in a second data chunk.

In yet another embodiment, at least one of said N data chunks is associated with first and second data appendices, wherein the first appendix comprises independent validation information for determining the accuracy of data in a first data chunk, and wherein the second data appendix comprises independent validation information for determining the accuracy of data in the second data chunk.

A second validation chunk may be independently associated with said N data chunks, wherein the second validation chunk is associated with a second validation appendix comprising second validation information for verifying accuracy of data recorded in said N data chunks. The second validation information for a first data chunk may be stored in at least a first data appendix associated with the first data chunk.

In some embodiments, the second validation information for a first data chunk is stored in at least a second data appendix associated with a second data chunk. A data chunk may comprise one or more sectors on a disk. In an exemplary embodiment, one or more data chunks may be included in a strip defined according to a RAID architecture.

In accordance with another aspect of the invention, a computing system or a computer program product comprising a computer useable medium having a computer readable program is provided. The computer readable program when executed on the computing system causes the computing system to perform the above-mentioned procedures.

One or more of the above-disclosed embodiments in addition to certain alternatives are provided in further detail below with reference to the attached figures. The invention is not, however, limited to any particular embodiment disclosed.

BRIEF DESCRIPTION OF THE DRAWINGS

Embodiments of the present invention are understood by referring to the figures in the attached drawings, as provided below.

Features, elements, and aspects of the invention that are referenced by the same numerals in different figures represent the same, equivalent, or similar features, elements, or aspects, in accordance with one or more embodiments.

DETAILED DESCRIPTION OF EXEMPLARY EMBODIMENTS

In the following, numerous specific details are set forth to provide a thorough description of various embodiments of the invention. Certain embodiments of the invention may be practiced without these specific details or with some variations in detail. In some instances, certain features are described in less detail so as not to obscure other aspects of the invention. The level of detail associated with each of the elements or features should not be construed to qualify the novelty or importance of one feature over the others.

In accordance with one or more embodiments, systems and methods for detecting, locating or correcting UDEs are provided. By way of example, certain embodiments are disclosed herein as applicable to a RAID architecture. It should be noted, however, that such exemplary embodiments should not be construed as limiting the scope of the invention, but as examples of possible implementations that are applicable in certain data storage environments.

In embodiment, a UDE may be detected when data is read from one or more disk drives (i.e., disks) for any purpose, such as for example writing new data to a stripe to prevent migration of bad data or hiding bad data that a parity scrub can no longer detect. When data is read from the disks for the purposes of a write (for example, in a read-modify-write operation), parity may be also read.

In one embodiment, parity information may provide a summary of multiple blocks of data (generally from different disks) in the stripe. A validated read may be employed where the data that is read from disk for return to a computing system (e.g., host) can be checked for UDE detection. Additional data validation may be accomplished by using additional but minimal disk overhead.

Figure 1:
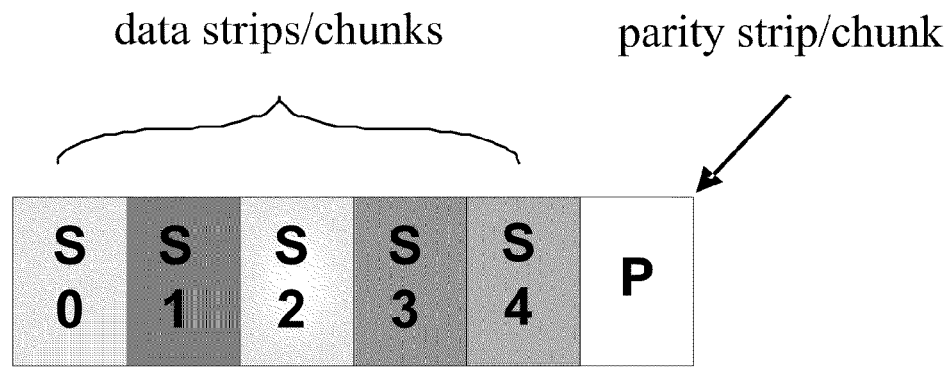
FIG. 1 illustrates an exemplary block diagram of a data stripe comprising multiple data chunks in conjunction with a parity chunk, in accordance with one or more embodiments.

Referring to FIG. 1, a data stripe comprising data strips/chunks S0 through S4 is illustrated in conjunction with a parity chunk P. The term "strip" or "chunk" refers to a unit of data or parity from a single disk. A strip or a chunk may comprise one sector, or multiple contiguous sectors on a disk. In an exemplary embodiment, (e.g., in the context of a RAID system), a stripe may comprise an integral number of chunks (e.g., one chunk), wherein each chunk comprises one or more sectors.

Different implementations are possible. For example, in one implementation a chunk comprise a single sector, so there are as many chunks in a strip as there are sectors in the strip. In another implementation, a strip comprises a single chunk, so there is one chunk per strip and the chunk comprises the same number of sectors as a strip. In yet another implementation, a strip comprises more than one chunk, and each chunk comprises more than one sector (e.g., if a strip is 32 sectors, a chunk unit is eight sectors, there are four chunks per strip).

Figure 2:
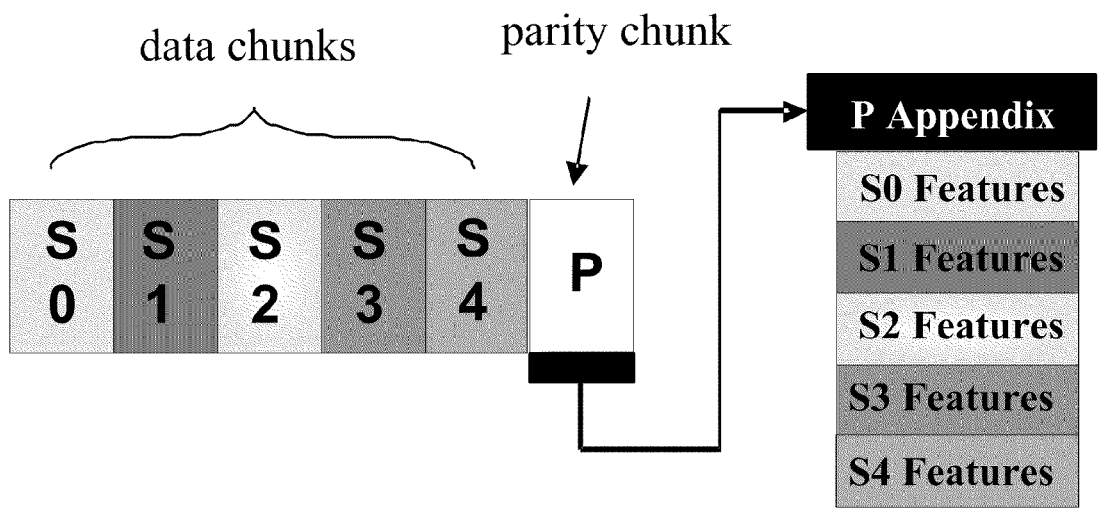
FIG. 2 is an exemplary block diagram of one or more data chunks with a parity chunk P and an associated appendix that comprises metadata for the one or more data chunks, in accordance with one embodiment.

The size of a chunk, depending on implementation, can be selected to balance storage overhead, IO cost overhead and other factors in a one or more embodiments. The term "appendix" refers to a unit of data (e.g., a sector or a subsector) that is, for example, appended to a chunk. Referring to FIG. 2, an appendix may comprise metadata (i.e., features S0 through S4) for one or more data chunks.

A data appendix may comprise the features for the data chunk to which the appendix is appended. An appendix for a parity chunk may comprise the features for one or more data chunks that contribute to the parity value. A data chunk may comprise metadata in at least one parity chunk per disk that it touches. Accordingly, when a parity chunk is read along with its appendix, the features for one or more of the data chunks related to that parity are also read.

In one embodiment, at least one parity chunk per disk has an appendix that comprises the metadata for one or more or possibly all data chunks. That is, the features for a data chunk stored in a parity appendix can be compared to the data (and optionally to the data's features stored in the data chunk's appendix) to validate consistency of the data with its features.

The features for a data chunk may comprise checksums of the data chunk (e.g., LRC, CRC, hash or other summary of the data chunk's contents), or may comprise the physical or logical block address of the data chunk, whether embedded in or separate from the checksum. In some embodiments, the features may comprise sequence numbers or timestamps that provide an ordering of the updates to the data chunk or other types of metadata that can be associated to the data chunk. In some embodiments, a data chunk may comprise its history and content, for example.

In one embodiment, checksums or sequence numbers may be utilized without limitation. The size (i.e., the number of bits or bytes) of the features can be selected among many possibilities but is generally constrained by the size of a parity chunk's appendix and the number of data chunks that contribute to the parity value. It may also be constrained by additional factors. For example, some SCSI disks can be formatted with 520, 524 or 528-byte sectors. And, in some embodiments, one or more of the bytes in an oversized sector beyond a standard 512-byte user sector may be used for an appendix.

In the foregoing, exemplary embodiments are provided in the context of a RAID4 system which comprises a fault tolerant, XOR-based erasure code. It is noteworthy, however, that depending on implementation the teachings provided here can be applied to other fault tolerant erasure codes as well, both Reed-Solomon (or finite field) based as well as XOR-based. The scope of the invention should be construed to cover storage systems based on other fault tolerant schemes.

Referring back to FIG. 1, in a RAID4 array, there are a plurality of data disks (e.g., disks S0 to S4) and preferably one parity disk (e.g., disk P0). Each data disk and the parity disk may be divided into subunits called strips (or stripe units) of a predetermined size. Horizontally, the set of strips at the same logical offset collectively form a stripe. The data stored in the data strips are XORed (exclusive ORed) together to compute the value stored in the parity stripe of that stripe.

In one embodiment, the stripes are subdivided into one or more "chunks." That is, a chunk may be a strip or a portion (e.g., a sector) of a strip with multiple chunks comprising a single strip. In the following, several exemplary error detection and recovery methods are provided, and for the purpose of brevity, a chunk is considered to comprise a strip, by way of example. It should be noted, however, that the scope of the invention should not be construed as limited to the following exemplary embodiments, as the concepts and teachings provided herein are equally applicable to any fault tolerance data storage and data recovery system.

Parity Appendix

Referring to FIG. 2, in one embodiment, a parity chunk has an appendix (e.g., parity appendix) adjoined to it. For example, when there is one parity chunk on the disk, each data chunk feature (e.g., S0 Features, . . . , S4 Features) is stored in the parity chunk appendix (e.g., P Appendix).

A feature may comprise at least a checksum of the corresponding data chunk. For example, when a data and a parity chunk are read for a read-modify-write operation to the data chunk, the parity appendix is also read. This may possibly and marginally increase the length of the parity IO but will not increase seek costs or disk accesses.

The checksum of the data chunk is computed from the read data and compared to that stored with the parity in the parity appendix. If the checksums agree, no UDEs have occurred and the operation can continue. If the checksums disagree, a UDE has occurred and the operation may terminate with error condition, because it may not be able to reliably continue without determining the cause of the UDE.

As shown, a simple two IO check is functionally equivalent to a five IO check (read 4 data chunks and the parity chunk) of a full parity scrub. Thus, it needs to be determined whether an error has occurred at the data chunk or at the parity chunk. As provided in more detail below, other means are needed to determine an additional course of action in an attempt to cure the error and complete the write. In some embodiments, if other data chunks are read and their checksums are compared to those features stored with the parity appendix, it may be possible to determine if the parity appendix is faulty (i.e., had a UDE).

The operation of reading the remaining portion of the stripe for the purposes of locating the error after first stage detection may be referred to as a complementary full stripe validate. For example, assuming that one disk is faulty and causing UDEs, then the parity is faulty if the checksums in the parity are inconsistent with two data chunks in the stripe. In such a case, the parity may be recomputed from the data chunks and the UDE can be repaired. In this embodiment, marginal additional storage overhead is introduced, but significant performance and additional correcting power are provided in comparison to a traditional data recovery algorithm (e.g., RAID5).

In one embodiment, to validate that the parity was written correctly, a checksum of the parity may be stored in the parity appendix. For example, on a read of the parity (e.g., in the context of a read-modify-write of data as described above), a recomputed checksum of the parity is compared with value stored in the appendix. If they match, then the parity and its appendix are written atomically.

In one embodiment, when a host read is issued to the array, the system may return unchecked data to the host by reading the data chunk. Alternatively, a more reliable validated read may be performed by reading the data chunk and the parity appendix, comparing a computed checksum of the read data and the stored checksum of the parity appendix and returning validated data if the checksums agree. This provides a reliable and efficient means to validate data during reads.

When the checksums do not agree, an error-handling algorithm may be applied. In accordance with one embodiment, a parity atomicity check is applied. If the parity check fails, then the parity appendix is incorrect. In one embodiment, a parity scrub may be applied to confirm whether or not the parity appendix is corrupt. If so, the parity appendix is recreated, and the read data may be returned to the host.

If the parity atomicity check succeeds, then a complementary full stripe validate (CFSV) operation may be performed. In this operation, one or more remaining data chunks in the stripe are read and their checksums are validated. If at least one of the checksums does not match, then the parity and the parity appendix are declared invalid and are reconstructed. And, preferably, the read data can be returned to the host.

In one embodiment, when a data/parity appendix metadata mismatch is detected in the stripe for the original read data, then an error is detected and either the data is incorrect or the parity and its appendix are incorrect. It may not be possible to disambiguate between these two cases, so a data loss event is declared and no data is returned to the host. In the error cases, an error report can be generated indicating, if possible, the drive where the error was located. An exemplary algorithms for detection and error handling (including possible location and correction) in the context of other operations such as short write, full stripe write, promoted full stripe write and rebuild is provided in further detail below.

In accordance with one aspect of the invention, it is determined whether a validated read or a normal (invalidated) read is needed. Depending on implementation, a user may be provided with the option to request or refuse validation. Alternatively, the validation may be performed either randomly or periodically. In one embodiment, the system, for performance reasons, may have validated reads turned off by default and at regular or random intervals (e.g., either in 10 sequence or temporally) and perhaps on a per drive basis or on an array basis, convert normal reads to validated reads.

Not requesting a read validation at every instance provides better overall performance and an added level of scrutiny on the quality of the data integrity. In accordance with an exemplary embodiment, for performance reasons, validated reads may be turned off by default. When sufficient errors are detected during writes (e.g., in read-modify-write) and a certain drive can be determined as suspect, then validated reads may be enabled for host reads on a suspect drive, for example. If one or more suspect drives are not identifiable then validated reads may be turned on for all drives, for example.

In a certain embodiment, when a full stripe write is issued from the host, the parity and the checksums for the data are computed and written to the disk. Preferably, no error checking is performed since no data is read from the disks. If the features comprise a sequence number, the sequence numbers for the data may be set to a fixed value (e.g., zero) and the data and the respective features can be written to the disks without knowing the values of the sequence numbers when the host full stripe write is issued.

Accordingly, no checking may be needed in the above scenario and a full stripe write can be used to refresh the data and parity in the stripe. Alternatives to a fixed value assignment include (a) a random value, in the same or a separate range from those assigned sequentially or (b) a sequential value for the entire stripe maintained either in memory (volatile or non-volatile) or on disk in some special location. In the volatile memory version, the volatile values can be restored after power cycle by either flushing the values to disk (e.g., using a firehose dump and then restoring on power-up) or read preemptively or on-demand or piggybacked on any read from the stripe.

When a host issues a write IO that is smaller than a full stripe write, the storage system may choose to implement it as a read-modify-write operation or may choose to implement it as a promoted full stripe write (or a partial promotion might be done in RAID6 with "parity compute" implementation of write). In this scenario, some data may be overwritten by the host operation, and the storage system may read the dependent data from the stripe that will not be overwritten.

In one embodiment, the dependent data is used along with new data from the host to compute parity as if for a full stripe write. That is, old parity may not be read from disk, and may be instead overwritten. In accordance with one embodiment, one extra read may be added to collect the features for dependent data, validate that data's correctness and complete the IO, if the data is validated. If the data is not validated, then the error path may include re-implementing the operation as a read-modify-write and failing the IO if that also fails to validate the data read from disk.

A parity appendix may provide validation of data in the absence of any disk failures (e.g., total loss of a disk or a hard sector error where the no data on a disk can be accessed). When disk failures occur, UDEs may not be detected and reconstruction of lost data may propagate or perpetuate additional UDE errors. For example, if the parity disk is lost, then there are no features available to validate the remaining data. Recomputation of parity must assume but cannot guarantee that the data chunks are correct and no UDEs had occurred.

Similarly, if a data disk is lost, a check of the consistency of the remaining data against the features stored in the parity appendix cannot reliably tell if a UDE occurred. It may be that the features were consistent but the parity was dropped when the failed disk was last updated. Thus, reconstruction of the lost disk may not guarantee that correct data is restored. However, if two or more features are inconsistent and one or more disks are dropping writes, then the parity chunk is inconsistent and the remaining data is correct. This means that the lost data may not be reliably reconstructed, as in some embodiments detection is provided when a data disk is lost.

Data Parity Appendix

Figure 3:
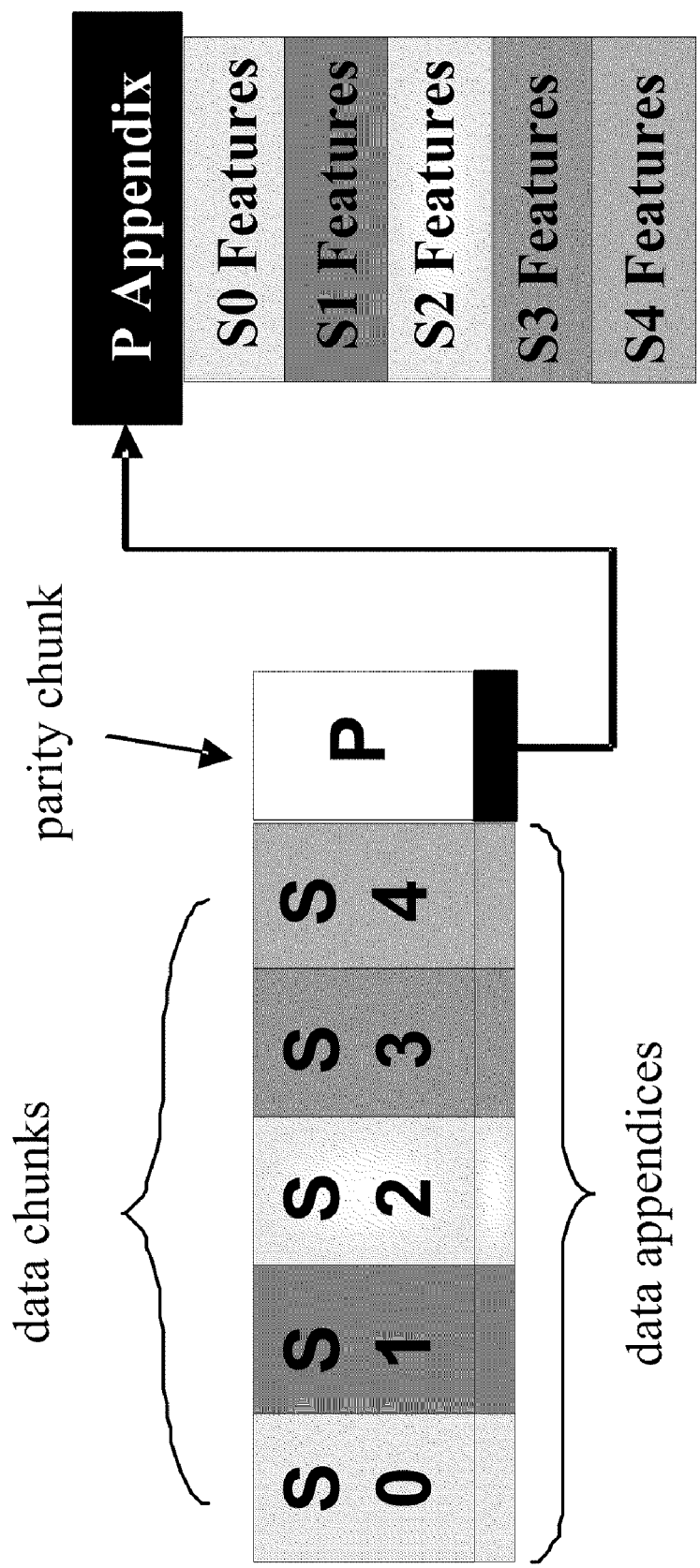
FIG. 3 illustrates a block diagram of one or more data chunks and associated data appendices together with a parity chunk P and its associated parity appendix wherein each data appendix comprises metadata for its associated data chunk and the parity appendix comprises metadata for the one or more data chunks, in accordance with one embodiment.

Referring to FIG. 3, in another embodiment, each data chunk may have an appendix (e.g., data parity appendix) comprising its own features and each parity chunk may comprise the feature set for one or more of its data chunks. In this embodiment, the feature sets may comprise, for example, a timestamp or a sequence number that indicates an ordering of the writes to each data chunk. When a data chunk and its parity chunk are read, the timestamps or sequence numbers are compared. If they agree, then the data and parity are correct and can be used as required (for example for a read-modify-write or for a validated host read).

If the timestamp or the sequence number information is inconsistent, then the most recent value points to the correct data or parity and the older timestamp points to the UDE. Accordingly, a UDE can be detected and located by way of the above-noted data parity checking process. Once a UDE is located, the data (or parity) can be assumed to have been lost or erased and a recovery algorithm can be applied to retrieve the correct data. Thus, the data parity appendix has the additional feature over and above that of the parity appendix in being able to locate and correct UDEs.

Buddy Parity Appendix

Figure 4:
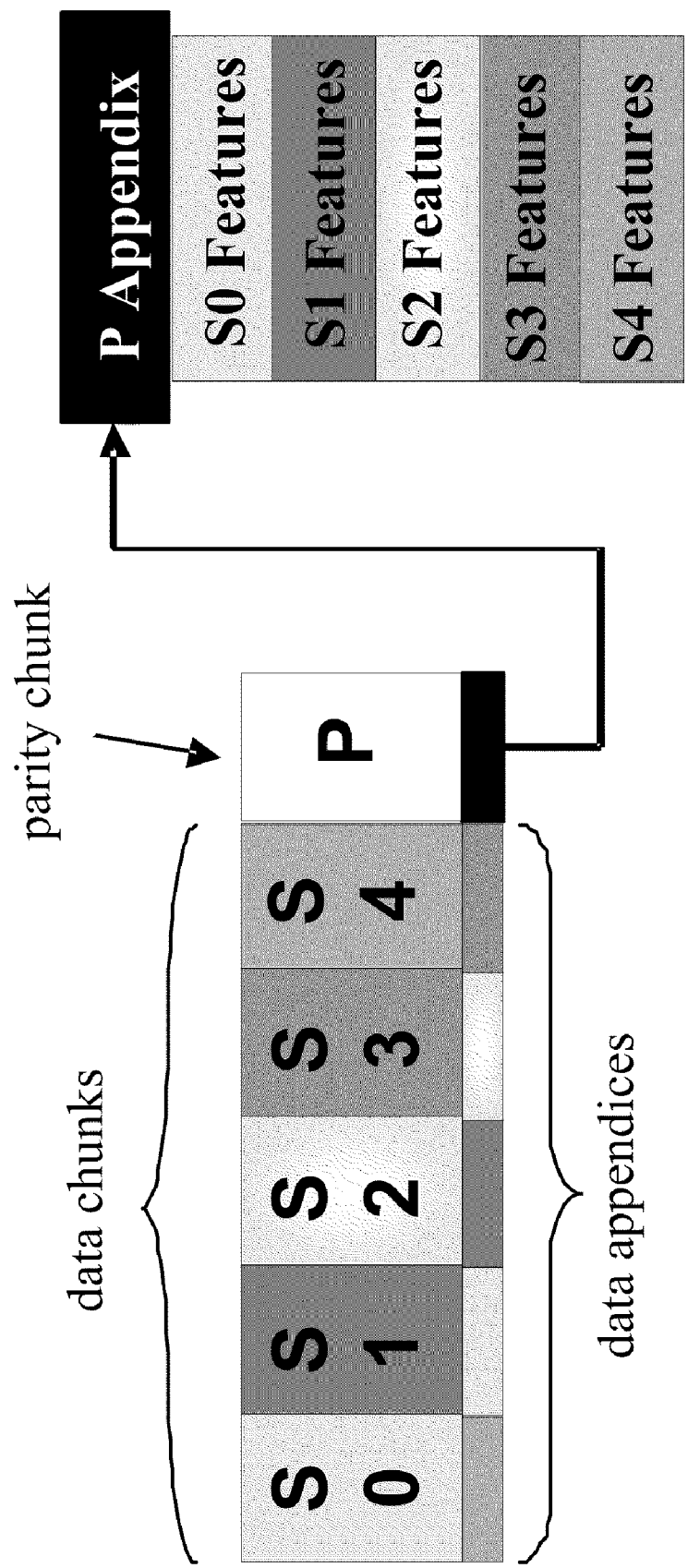
FIG. 4 illustrates a block diagram of one or more data chunks and associated data appendices together with a parity chunk P and its associated parity appendix wherein each data appendix comprises metadata for an unassociated data chunk and the parity appendix comprises metadata for the one or more data chunks, in accordance with one embodiment.

Referring to FIG. 4, when a parity disk is lost, a data or UDE parity can be detected, located and corrected, using a scheme (e.g., buddy parity appendix) implemented in accordance with another embodiment. In such embodiment, the parity appendix comprises the features for one or more data chunks in the parity, such that each data chunk is, preferably, paired with a data chunk buddy so that a copy of the features for a data chunk is stored in the appendix of its buddy. In other words, instead of each data chunk being paired with its own data appendix (e.g., S0 being paired with S0 appendix) a data chunk is paired with another data chunk's data appendix (e.g., S0 is paired with S4 appendix).

One exemplary method of assigning a buddy is via a simple next neighbor relation, with or without rotation. For example, in an array with four data disks, a data chunk on disk1 has as its buddy the data chunk on disk2, a data chunk on disk2 has as its buddy the data chunk on disk3, a data chunk on disk3 has as its buddy the data chunk on disk4 and a data chunk on disk4 has as its buddy the data chunk on disk1. Other methods are also possible for buddy assignments (e.g., pairings) without detracting from the scope of the invention.

In this embodiment, the features may comprise a checksum. To verify accuracy of data read, a data chunk can be checked against the checksum stored in the appendix of the parity chunk. If there is no inconsistency, then the operation may proceed. Otherwise, the buddy's appendix may be read and used to determine whether the data chunk or the parity chunk is in error. The chunk consistent with the buddy appendix is assumed to be the correct one.

The intermediate operation of reading the buddy can be used to optimize an error-handling algorithm. In other words, a majority vote among the three members (the data chunk, the buddy appendix and the parity appendix) determines which member is in error. Accordingly, a UDE can be detected, located and corrected, when no disks have failed. However, when one disk is lost, this embodiment is implemented such that two features are available for comparison. Thus, when a disk or a parity disk is lost, UDEs can be detected and located. Advantageously, no additional storage overhead is needed in comparison to the earlier discussed methods. An additional write (and possibly a read) operation may be needed in some embodiments to update the buddy's appendix during a write.

Data Buddy Parity Appendix

Figure 5:
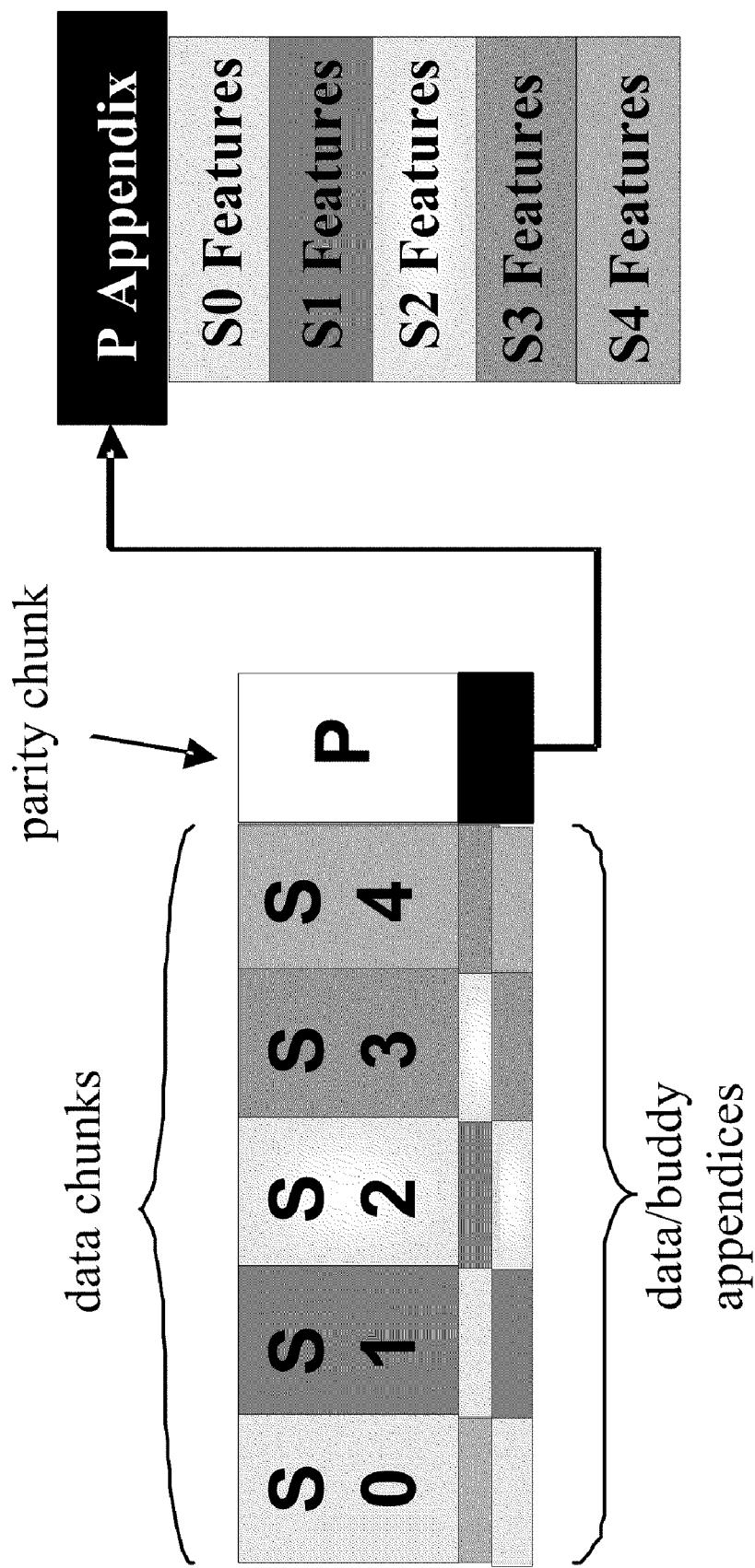
FIG. 5 illustrates a block diagram of one or more data chunks, wherein the features for a data chunk can be stored in multiple locations to provide a higher level of redundancy for data recovery and correction, in accordance with one embodiment.

Referring to FIG. 5, yet another embodiment may be implemented so that the features for a data chunk can be stored in at least one or more of the following locations: (a) in the parity appendix, (b) in the data chunks' appendices and (c) in a buddy's appendix of the data chunks. As such, this embodiment provides a higher level of redundancy for data recovery and correction. In one embodiment, the features may comprise a sequence number or timestamp. Accordingly UDE detection, location and correction can be provided when either a data disk or the parity disk is lost.

In certain embodiments, a data chunk's metadata may be stored in the appendix of more than one buddy. In another embodiment, a data chunk's metadata may be stored in every data chunk's appendix. In such embodiment, the contents of a parity chunk's appendix are replicated in every data chunk appendix, for example. Maintaining metadata for a data chunk in multiple buddy appendices may induce additional write operations, since a copy of the metadata may be updated with every write.

The additional write operations may be mitigated by a lazy update process which works in conjunction with sequence numbers (or other generation number, timestamp or other ordering tags) as provided in more detail below. The erasure code may tolerate the loss of one disk (i.e., one strip). Consequently, if a short write updates one buddy appendix with the most recent sequence number, then in the presence of a disk loss, there will be one "most recent" copy (either the parity chunk appendix's copy or the buddy's or both).

In one embodiment, a read of one or more of the appendices determines the most recent value, providing a check against data read from the stripe. Accordingly, if the erasure code tolerates T disk/strip losses, then T+2 may be updated during each write operation. Preferably, one copy is stored in the data chunk appendix and T copies are stored with the affected parity chunks. As such, a buddy appendix is updated during a short write. T parity chunks may be made available in an exemplary embodiment that has a T fault tolerant code.

The above-mentioned embodiments may be implemented to apply to various fault tolerant systems (e.g., RAID 4, RAID5, RAID6, etc.) with additional functionality to detect, locate and correct UDEs. In a higher fault tolerant system, a data chunk may be represented in more than one parity chunk. Consequently, each data chunk's features may be stored in more than one parity chunk appendix. As noted earlier, the additional redundancy of the data chunk features provides for additional detection/location/correction power.

Figure 6:
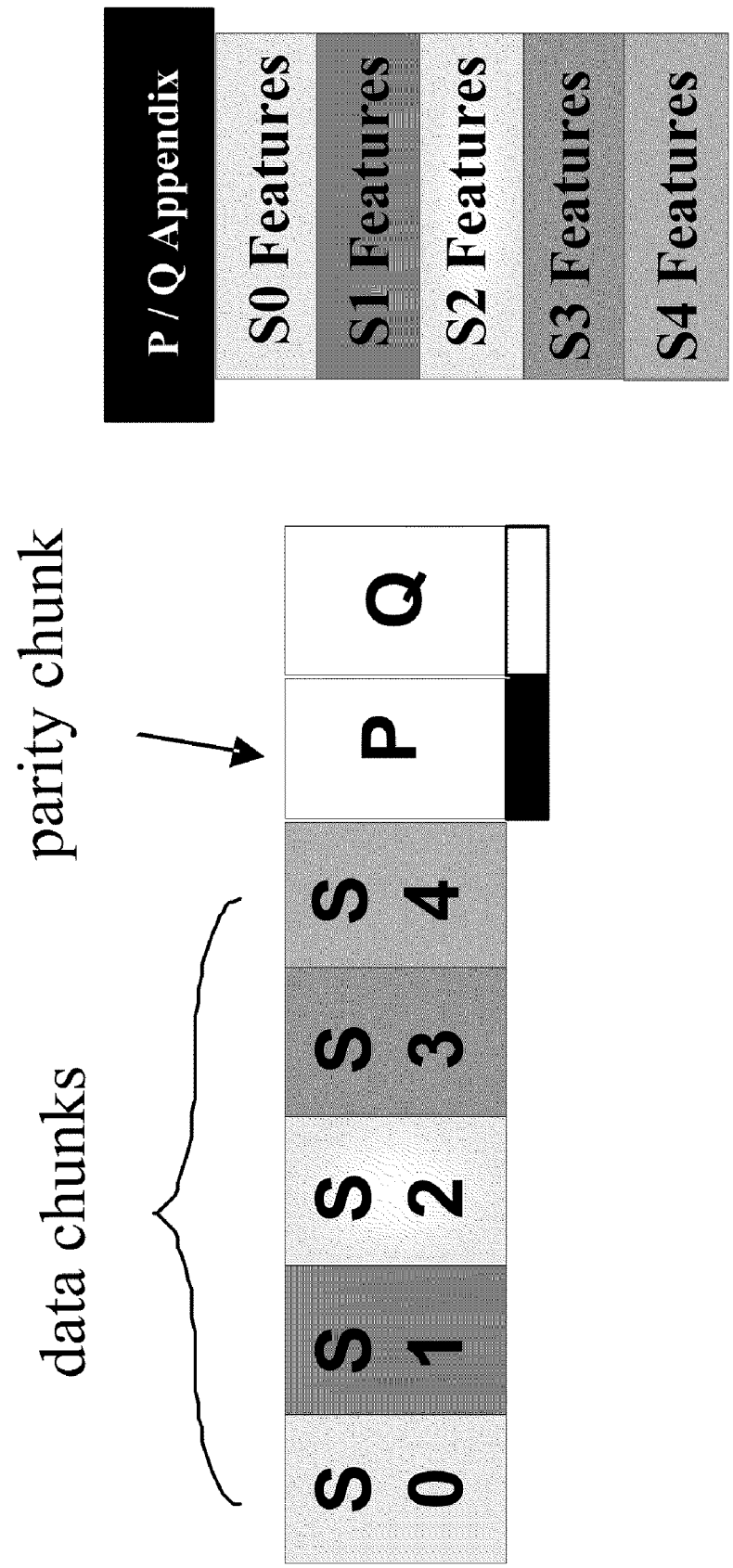
FIG. 6 illustrates the block diagram of FIG. 2 having an additional parity chunk Q and an associated appendix, in accordance with one embodiment.

Referring to FIG. 6, for example, in a RAID6 system, implemented say by a Reed-Solomon code or other code using finite field arithmetic, a parity appendix may have two copies of each data chunk checksum. When a data chunk is read for a read-modify-write, both parity chunks are also read in the normal course of the operation. The invention requires reading also the appendices for the two parity chunks. A consistency check of the data chunk's computed checksum and the two stored checksum will determine (by majority vote) if one of the chunks experienced a dropped and which one.

In the case of detection and location, a RAID6 algorithm can reconstruct the incorrect data. However, location is not required in RAID6 when no disks have failed. Once a UDE is detected, the RAID6 location and correction algorithm can be applied. In an exemplary embodiment, a majority vote is not needed for location and correction. When one data disk is lost, the majority vote method may be used to detect, locate and correct.

In certain embodiments, when a parity disk is lost a parity appendix (e.g., for RAID5) may be utilized with no disks lost (e.g., when one of the checksums is lost). However, in the case where more than one data disk is lost, a parity appendix may be used to detect and locate the UDEs. Similar analysis may be applied to the above-described embodiments when extended to, for example, RAID6 or other fault tolerant recovery algorithms.

A recovery algorithm may be based on XOR computations such as an EVENODD scheme, in accordance with one or more embodiments. The EVENODD scheme is an efficient parity placement scheme for tolerating multiple disk failures in, for example, a RAID architecture. The codes of the EVENODD scheme are optimal block codes based on XOR operations which make the complexity of the EVENODD scheme simpler than other schemes that require computation over finite fields.

Figure 7:
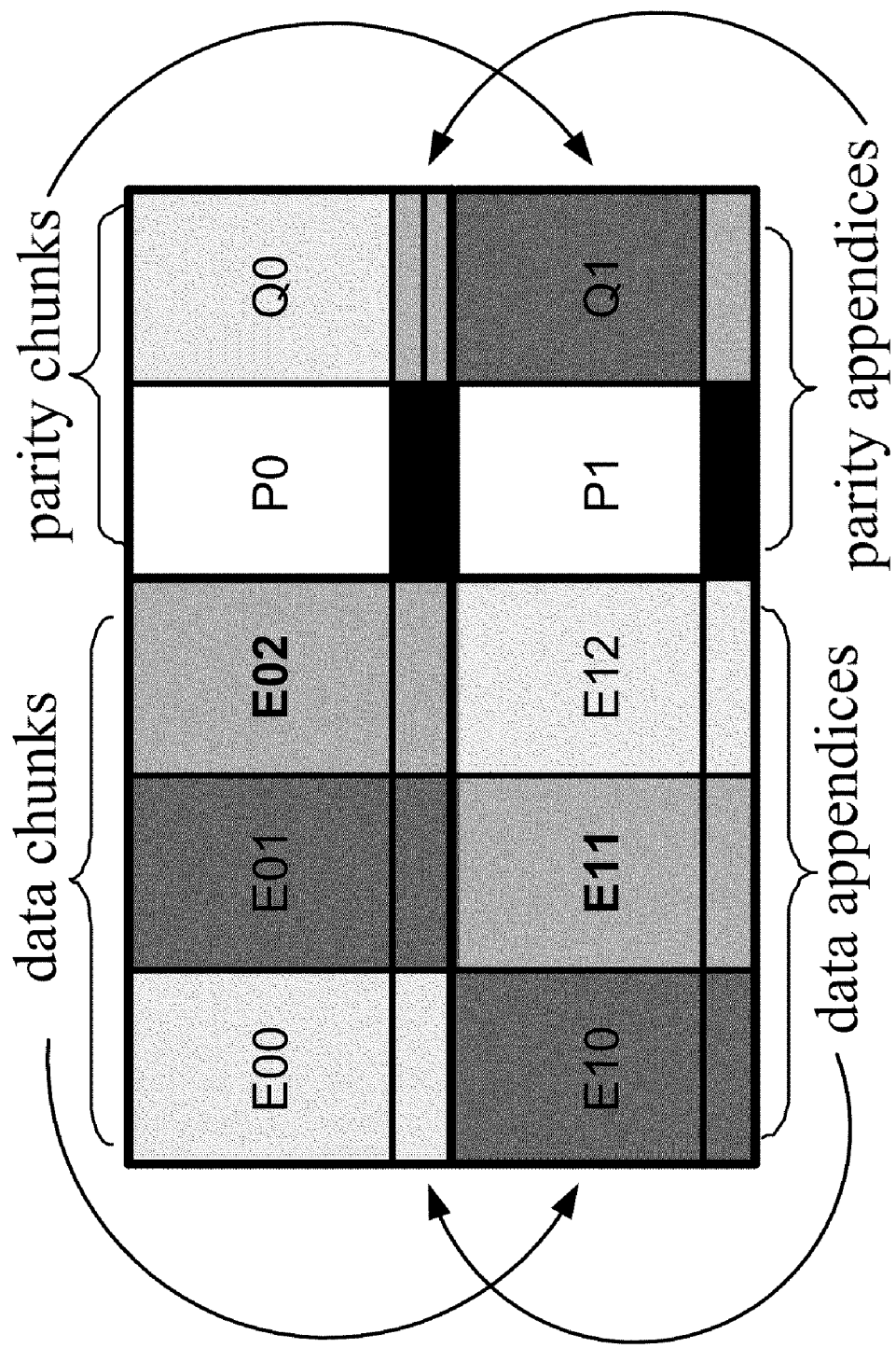
FIG. 7 is an exemplary block diagram of data chunks and parity chunks in a fault tolerant storage system in which a parity appendix comprises metadata for the data chunks that contribute to the XOR calculation of the parity chunks value, in accordance with one embodiment.

Referring to FIG. 7, in exemplary embodiments, a parity appendix may comprise metadata for the data chunks that contribute to the XOR calculation of the parity chunks value. The embodiment depicted in FIG. 7 may be utilized for an EVENODD code with parameter prime p=3, for example. Each chunk may represent elements in the XOR computation rules. The element may comprise an integral number of chunks, greater than one. In another exemplary embodiment, the data elements on each disk may be combined into a single chunk.

As shown in FIG. 7, in an exemplary embodiment, the layout may be similar to that of a Reed-Solomon, where parity value P0 is computed as the XOR of E00, E01 and E02; parity value P1 is computed as the XOR of E10, E11 and E12; parity value Q0 is the XOR of E00, E12 and E11, E02; parity value Q1 is the XOR of E10, E01 and E11, E02, for example. The appendix for P0 comprises the metadata for E00, E01 and E02 (e.g., the chunks that contribute to its value).

In the exemplary embodiment shown, the appendix for P1 comprises the metadata for E10, E11 and E12. The appendix for Q0 comprises the metadata for E00, E12, E11 and E02. Finally, the appendix for Q1 comprises the metadata for E10 and E01 and may optionally comprise the metadata for E11 and E02. As such, each data chunk's metadata appear in two parity appendices on separate disks. Data chunks E11 and E02 appear in the parity computations for both Q0 and Q1, so their metadata may appear in the appendices for Q0, Q1 or both.

Another exemplary embodiment may apply to a RAID1 architecture having disks that provide data redundancy by mirroring data stored on other disks in the storage system. The data on each disk is divided into chunks of some predetermined size, preferably, the same size on each disk. Corresponding data chunks on each disk comprise identical data values. When a UDE occurs during the update of a data chunk, one disk will comprise the new data for the chunk and the failing disk will comprise stale or corrupted data.

In one embodiment, each data chunk is adjoined with an appendix that comprises a sequence number for that data chunk. The sequence number is incremented each time the data is written. When reading the data, both mirrored chunks and their appendices are read. The sequence numbers are compared and if they agree, then no UDEs have occurred and the data can be returned to the host. If the sequence numbers differ, then the data chunk with the higher sequence number is presumed to be correct and can be returned to the host.

The data chunk with the lower sequence number is presumed to be stale (i.e., due to an UDE) and can be repaired by rewriting the good data over the stale data, and preferably updating the sequence number. During a write operation, one or more data appendices may be read to determine the current sequence number and if needed validate the larger value if in fact they differ. The sequence number is then incremented and the new data is written to each data chunk mirror along with the updated sequence number.

In summary, one or more embodiments may be implemented to apply to RAID architectures that provide redundancy of the data, such as RAID1, RAID4, RAID5 and RAID6. In some embodiments, data and parity strips in a RAID stripe are divided into chunks. Chunks may be sectors, multiple sectors or complete strips. For a data chunk, metadata (i.e., features) are generated. Metadata may comprise one or more checksums (e.g., LRCs, CRCs, hashes, etc.), logical or physical block address and/or sequence number values (e.g., timestamps, generation numbers, etc.) that may be stored separately or encoded together to reduce the size, in bits or bytes, of the metadata.

Appendix space is, preferably, allocated to or associated with a parity chunk and optionally with a data chunk. When one or more copies of the metadata for a data chunk are stored in buddy data appendices, an appendix may comprise the header bytes of oversized sectors. Depending on implementation, a copy of the metadata for a data chunk may be stored in one or more of the following locations: (a) in the appendix for at least one parity chunk per disk whose value is computed from the given data chunk; (b) in the appendix of the data chunk itself; and (c) in the appendix of one or more additional data chunks (i.e., buddies).

In one embodiment, when an appendix is a sector or sub-sector such that the writing a data chunk and its appendix cannot be guaranteed atomicity and consistency, then the appendix of the data chunk comprises a checksum of the data in the data chunk to provide an atomicity check. The disk drives provide atomicity guarantees when the appendix is in the header bytes of an oversized sector.

During a read operation of data, one or more copies of the metadata may be optionally read to verify the consistency of the data with its metadata. When a mismatch occurs location algorithms can be applied. The location algorithms may determine that (a) a data chunk is invalid, (b) a parity chunk is invalid (c) some appendix is invalid. To make such determination, the algorithms may read one or more or all of the remaining copies of the metadata or read other data and one or more copies of their associated metadata in order to determine the source of the error. When the error is located, in the absence of too many disk failures, the data may be reconstructed by, for example, a RAID recovery algorithm.

During a write operation implemented as a read-modify-write where the data and its associated parity are read and the parity is updated, the parity appendices are read (as is the data appendix if it comprises the data's metadata) and the metadata for the data is verified. When a mismatch occurs, location algorithms can be applied. When no mismatch occurs, the data's metadata is updated and stored with the parity update and with the data update if the data appendix comprises its own metadata. In addition, if the data's metadata is stored in the appendix of one or more buddies, then one or more of said appendices are also updated.

In one embodiment, during a promoted full stripe write, data that read from a stripe is verified against one or more copies of the metadata also read from one or more appendices. If a mismatch occurs, other location algorithms are employed to determine the source of the mismatch. If no mismatch is found, the metadata for the new data is updated and stored in the associated appendices along with the updated parity values.

During a full stripe write, new metadata is generated along with one or more new parity values and stored in the appropriate appendices. If sequence numbers are used, a particular sequence number may be used in order to mitigate the requirement to read one or more appendices to get the current sequence numbers for all the data. This particular sequence number may be a fixed value or may be generated randomly or may be stored in memory for quick access. A single sequence number may be maintained for each stripe. Preferably, data's metadata have the same sequence number during a full stripe write.

In one embodiment, when metadata is checked, validated reads may be enabled by default, by user setting, by periodic or random triggers or automatically against a suspicious drive or drives when some errors are detected during write operations.

Figure 8:
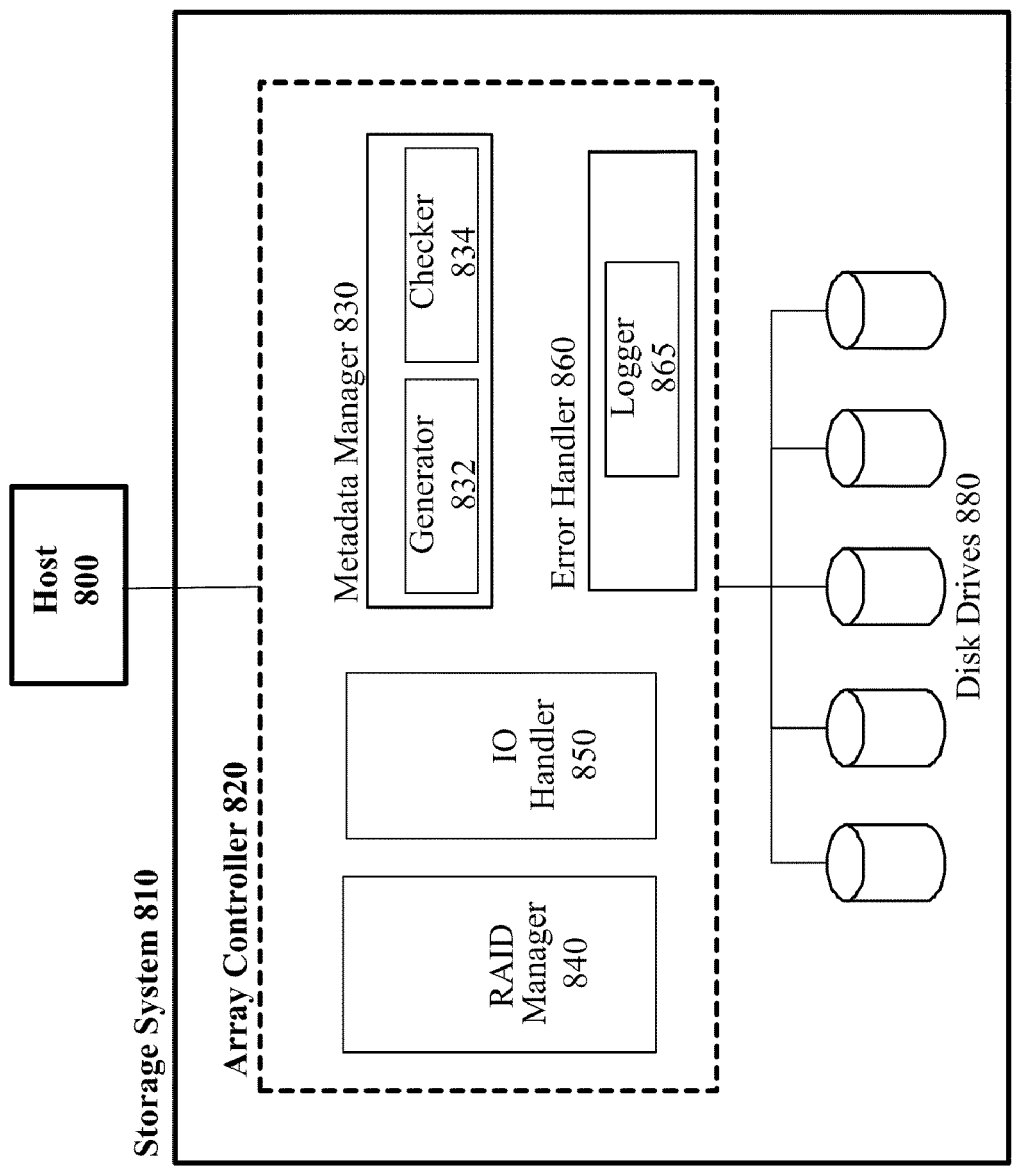
FIG. 8 is an exemplary block diagram of a data storage environment and its components, in accordance with one or more embodiments.

Referring to FIG. 8, an exemplary data storage environment in accordance with one or more embodiments is provided. The data storage environment comprises a storage system 810 and a host (e.g., computing system) 800 that interacts with storage system 810 to read or write data to disk drives 880. In one embodiment, an array controller (i.e., disk controller) 820 is provided to manage and service read and write requests submitted by host 800 to storage system 810 and to also provide error detection and data recovery services.

Array controller 820 may comprise a RAID manager 840, IO handler 850, a metadata manager 830 and an error handle 860. RAID manager 840 is configured to manage the tasks and operations associated with maintaining data on disk drives 880 in a fault tolerant environment. IO handler controls the input and output of data to the array controller 820 according to instructions provided by RAID manager 840.

Metadata manager 830 comprises a generator 832 and checker 834. Metadata generator 832 is configured to generate metadata that is to be stored in data appendices or parity appendices for data chunks stored on disk drives 880. Metadata checker 834 is configured to verify accuracy of metadata stored on disk drives 880 in response to an IO request.

Figure 9:
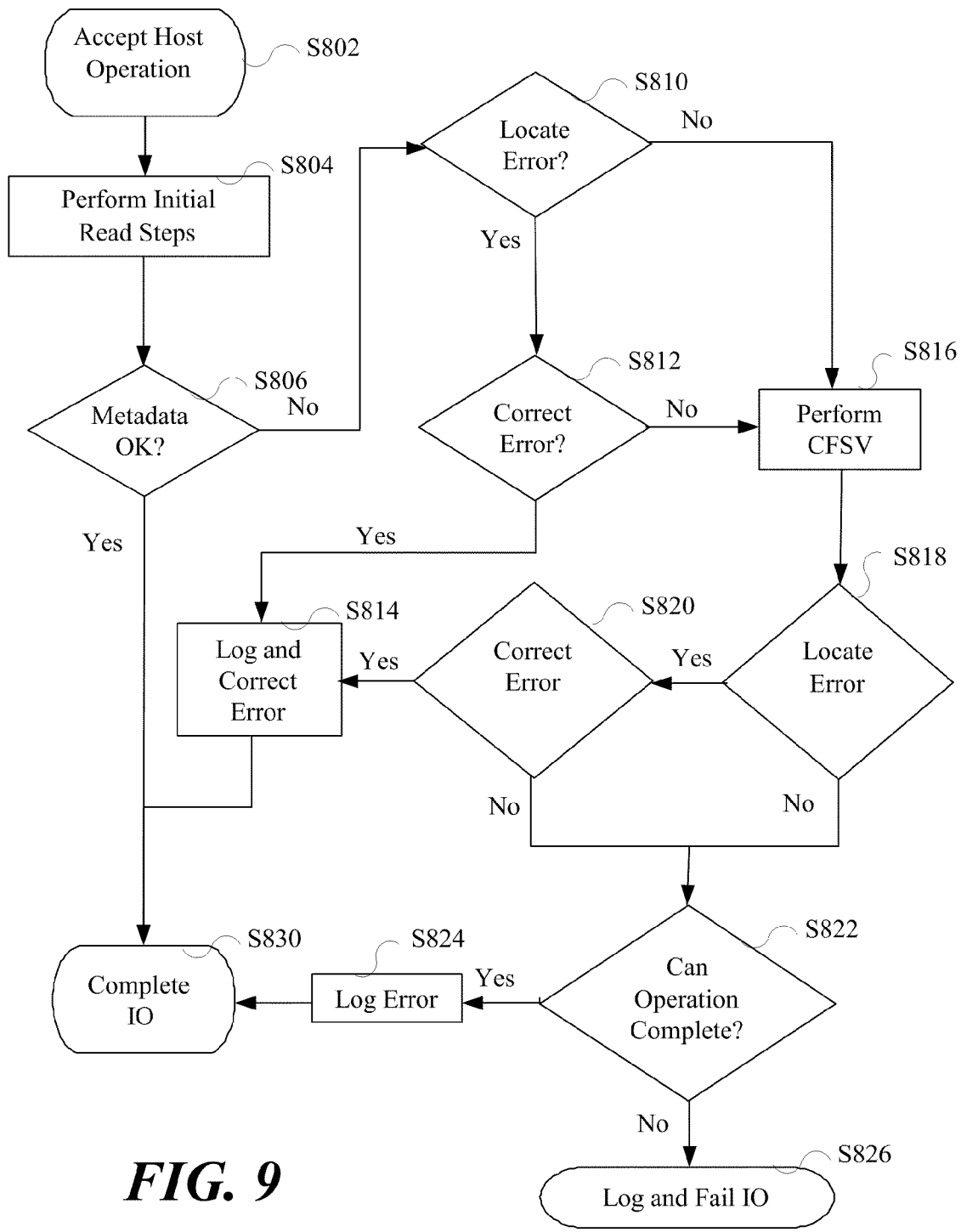
FIG. 9 is a flow diagram of a method of detecting, locating and correcting corrupted data in a data storage system, in accordance with one embodiment.

Referring to FIG. 9, a method for verifying the accuracy of metadata in accordance to one or more embodiments is provided. A host 800 may submit a request for read or write operation to be performed on disk drives 880. Array controller 820 may receive and accept to perform the requested operation (S802).

To perform the requested operation, RAID manager 840 and IO handler 850 cooperate to, for example, read the designated data from data chunks on disk drives 880 (S804) and checker 834 in metadata manager 830 verifies based on the metadata whether data stored in the data chunks is valid by employing one or more data validation methods discussed earlier (S806). If the metadata indicates that the data is valid, then the requested IO operation is completed (S830).

Otherwise, the system attempts to determine the location of the error, preferably by analyzing the metadata and the information embedded therein (S810). If the system is successful in locating and correcting the error, then an entry regarding the location and possibly reason of the error is logged into a database or other data structure (S812-S814).

If the system cannot locate or correct a located error, then the system resorts to perform a CFSV operation as provided earlier in the application to determine the source or cause of the error (S816). If the CFSV operation is successful in finding the cause and location of the error, then the error is corrected (S818-S820). Otherwise, the system determines if the host requested IO operation can be completed without correcting the error (S822).

It should be noted, however, that a method short of a full CFSV may assist in locating an error in certain systems (e.g., RAID6 or higher architectures). For example, during a read operation, one parity appendix metadata may be read. If an error is detected, then the other parity's appendix can be read to assist in locating the error. The noted step can be repeated with each additional parity appendix until some or all the parity appendices have been checked. If these are insufficient, then a full CFSV might be needed.

Referring back to FIGS. 8 and 9, if the IO operation can be performed without locating and correcting the error, then the system logs the error and completes the IO operation (S824-S830). Otherwise, the system will log a failure without performing the requested operation (S826). In some embodiments, the error log is maintained and updated by logger 865 and the metadata is maintained and updated by generator 832 in metadata manager 830.

In different embodiments, the invention can be implemented either entirely in the form of hardware or entirely in the form of software, or a combination of both hardware and software elements. For example, host 800, storage system 810 and exemplary data recovery software (e.g., RAID software) discussed herein may comprise a controlled computing system environment that can be presented largely in terms of hardware components and software code executed to perform processes that achieve the results contemplated by the system of the present invention.

Figure 10:
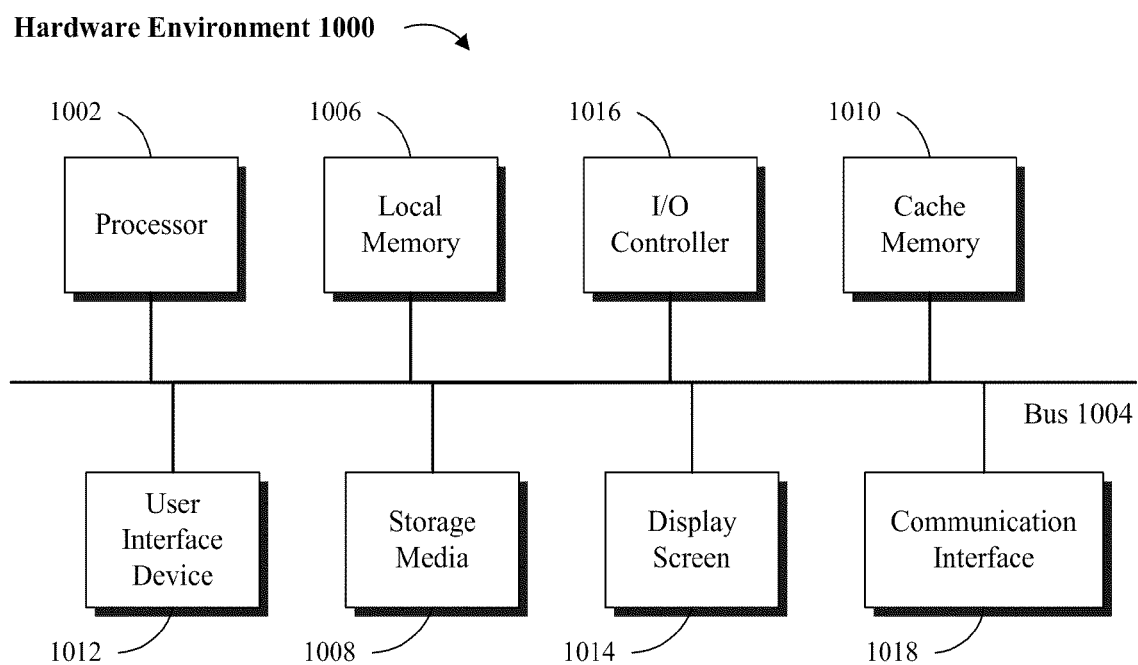
FIGS. 10 and 11 are block diagrams of hardware and software environments in which the system of the present invention may operate, in accordance with one or more embodiments.
Figure 11:
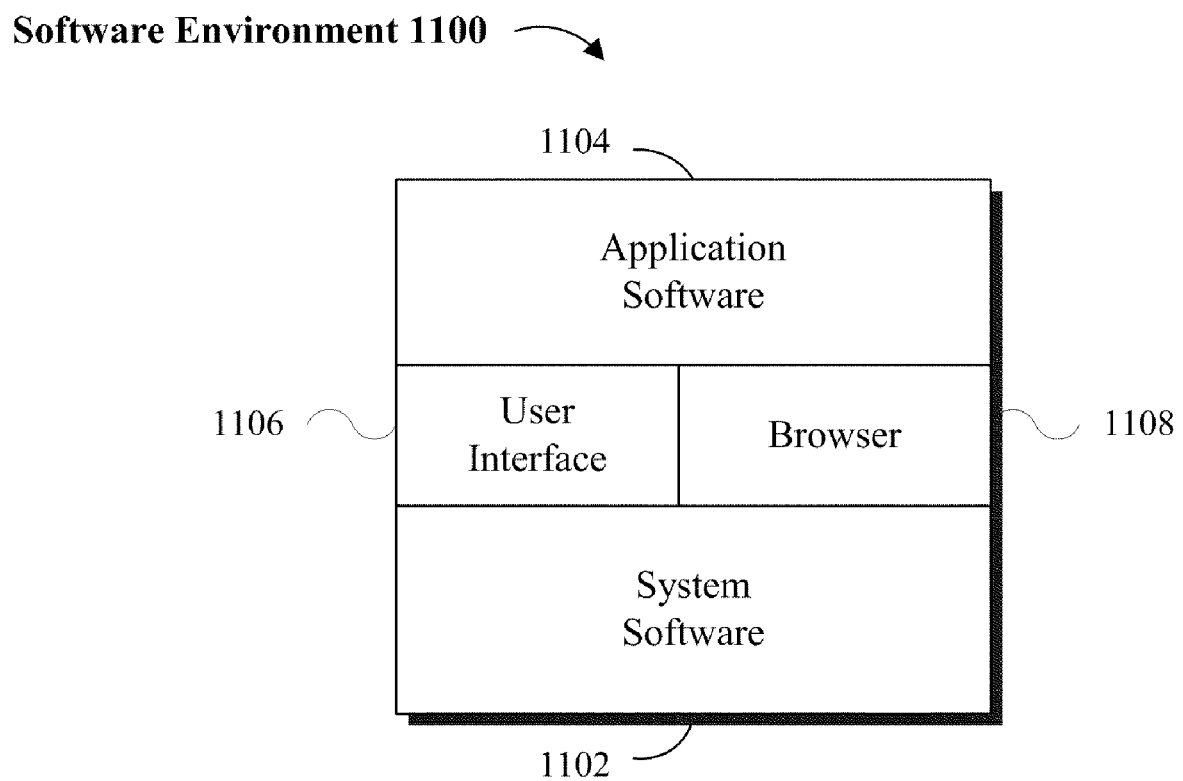

Referring to FIGS. 10 and 11, a computing system environment in accordance with an exemplary embodiment is composed of a hardware environment 1000 and a software environment 1100. The hardware environment 1000 comprises the machinery and equipment that provide an execution environment for the software; and the software provides the execution instructions for the hardware as provided below.

As provided here, the software elements that are executed on the illustrated hardware elements are described in terms of specific logical/functional relationships. It should be noted, however, that the respective methods implemented in software may be also implemented in hardware by way of configured and programmed processors, ASICs (application specific integrated circuits), FPGAs (Field Programmable Gate Arrays) and DSPs (digital signal processors), for example.

Software environment 1100 is divided into two major classes comprising system software 1102 and application software 1104. System software 1102 comprises control programs, such as the operating system (OS) and information management systems that instruct the hardware how to function and process information.

In one embodiment, the data recovery software may be implemented as system software 1102 and application software 1104 executed on one or more hardware environments to facilitate error detection and data recovery in storage system 810. Application software 1104 may comprise but is not limited to program code, data structures, firmware, resident software, microcode or any other form of information or routine that may be read, analyzed or executed by a microcontroller.

In an alternative embodiment, the invention may be implemented as computer program product accessible from a computer-usable or computer-readable medium providing program code for use by or in connection with a computer or any instruction execution system. For the purposes of this description, a computer-usable or computer-readable medium can be any apparatus that can comprise, store, communicate, propagate or transport the program for use by or in connection with the instruction execution system, apparatus or device.

The computer-readable medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk read only memory (CD-ROM), compact disk read/write (CD-R/W) and digital videodisk (DVD).

Referring to FIG. 10, an embodiment of the system software 1102 and application software 1104 can be implemented as computer software in the form of computer readable code executed on a data processing system such as hardware environment 1000 that comprises a processor 1002 coupled to one or more computer readable media or memory elements by way of a system bus 1004. The computer readable media or the memory elements, for example, can comprise local memory 1006, storage media 1008, and cache memory 1010. Processor 1002 loads executable code from storage media 1008 to local memory 1006. Cache memory 1010 provides temporary storage to reduce the number of times code is loaded from storage media 1008 for execution.

A user interface device 1012 (e.g., keyboard, pointing device, etc.) and a display screen 1014 can be coupled to the computing system either directly or through an intervening I/O controller 1016, for example. A communication interface unit 1018, such as a network adapter, may be also coupled to the computing system to enable the data processing system to communicate with other data processing systems or remote printers or storage devices through intervening private or public networks. Wired or wireless modems and Ethernet cards are a few of the exemplary types of network adapters.

In one or more embodiments, hardware environment 1000 may not include all the above components, or may comprise other components for additional functionality or utility. For example, hardware environment 1000 may be a laptop computer or other portable computing device embodied in an embedded system such as a set-top box, a personal data assistant (PDA), a mobile communication unit (e.g., a wireless phone), or other similar hardware platforms that have information processing and/or data storage and communication capabilities.

In certain embodiments of the system, communication interface 1018 communicates with other systems by sending and receiving electrical, electromagnetic or optical signals that carry digital data streams representing various types of information including program code. The communication may be established by way of a remote network (e.g., the Internet), or alternatively by way of transmission over a carrier wave.

Referring to FIG. 11, system software 1102 and application software 1104 can comprise one or more computer programs that are executed on top of operating system 112 after being loaded from storage media 1008 into local memory 1006. In a client-server architecture, application software 1104 may comprise client software and server software. For example, in one embodiment of the invention, client software is executed on computing systems 110 or 120 and server software is executed on a server system (not shown).

Software environment 1100 may also comprise browser software 1108 for accessing data available over local or remote computing networks. Further, software environment 1100 may comprise a user interface 1106 (e.g., a Graphical User Interface (GUI)) for receiving user commands and data. Please note that the hardware and software architectures and environments described above are for purposes of example, and one or more embodiments of the invention may be implemented over any type of system architecture or processing environment.

It should also be understood that the logic code, programs, modules, processes, methods and the order in which the respective steps of each method are performed are purely exemplary. Depending on implementation, the steps may be performed in any order or in parallel, unless indicated otherwise in the present disclosure. Further, the logic code is not related, or limited to any particular programming language, and may comprise of one or more modules that execute on one or more processors in a distributed, non-distributed or multi-processing environment.

Therefore, it should be understood that the invention can be practiced with modification and alteration within the spirit and scope of the appended claims. The description is not intended to be exhaustive or to limit the invention to the precise form disclosed. These and various other adaptations and combinations of the embodiments disclosed are within the scope of the invention and are further defined by the claims and their full scope of equivalents.

What is claimed is:

1. A data integrity evaluation method comprising:
receiving a request for performing an operation on a first data chunk from among N data chunks respectively written across N storage mediums,
wherein a recovery chunk recorded on a second storage medium independent of said N storage mediums is associated with said N data chunks such that recovery information included in said recovery chunk is calculated based on collective value of data stored in said N data chunks,
wherein the recovery chunk is associated with a first validation appendix comprising a set of N validation information, wherein each of the N validation information corresponds to one of the N data chunks and each validation information is usable to independently validate the respective data chunk;
attempting to validate the first data chunk based on first validation information associated with the first data chunk; and
in response to not being able to validate the first data chunk based on the first validation information, examining secondary validation information associated with one or more data chunks other than the first data chunk to determine whether the first data chunk is valid.

2. The method of claim 1, wherein the secondary validation information is stored in the first validation appendix on the second storage medium in association with the recovery chunk.

3. The method of claim 1, wherein the secondary validation information is stored on one or more of the N storage mediums in association with one or more data chunks other than the first data chunk.

4. The method of claim 1, wherein examining the secondary validation information, in response to not being able to validate the first data chunk based on the first validation information, comprises:
examining N−1 validation information in the first validation appendix against the corresponding other N−1 data chunks to determine whether the first data chunk is valid.

5. The method of claim 1, wherein examining the secondary validation information, in response to not being able to validate the first data chunk based on the first validation information, comprises:
examining a second validation appendix including second validation information associated with a second data chunk to determine whether the first data chunk is valid.

6. The method of claim 1, further comprising:
in response to determining that the first data chunk is invalid, reconstructing the first data chunk based on the recovery information in the recovery chunk and based on the value of the other N−1 data chunks.

7. The method of claim 1, further comprising:
in response to determining that the first data chunk is valid, updating the recovery chunk based on the collective value of the N data chunks.

8. The method of claim 1, further comprising:
in response to determining that the first data chunk is valid, updating the validation information in the first validation appendix based on the corresponding values of the N data chunks.

9. The method of claim 1, wherein the recovery information is usable to reconstruct one or more of said N data chunks.

10. The method of claim 1 wherein the recovery chunk is one of a plurality of recovery chunks.

11. The method of claim 10, wherein examining the secondary validation information, in response to not being able to validate the first data chunk based on the first validation information, comprises:
examining a second validation information associated with a second recovery chunk to determine whether the first data chunk is valid.

12. A system for data integrity evaluation comprising:
N storage mediums on which data is written in a first data chunk from among N data chunks respectively written across the N storage mediums;
a second storage medium independent of said N storage mediums, wherein a recovery chunk is recorded on said second storage medium,
wherein the recovery chunk is associated with said N data chunks such that recovery information included in said recovery chunk is calculated based on collective value of data stored in said N data chunks,
wherein the recovery chunk is associated with a first validation appendix comprising a set of N validation information, wherein each of the N validation information corresponds to one of the N data chunks and each validation information is usable to independently validate the respective data chunk,
wherein a first validation information is associated with the first data chunk and a secondary validation information is associated with one or more data chunk other than the first data chunk;
a controller for receiving a request for performing an operation on the first data chunk from among said N data chunks,
wherein the controller attempts to validate the first data chunk based on the first validation information, and
wherein the controller, in response to not being able to validate the first data chunk based on the first validation information, examines the secondary validation information to determine whether the first data chunk is valid.

13. The system of claim 12, wherein the secondary validation information is stored in the first validation appendix on the second storage medium in association with the recovery chunk.

14. The system of claim 12, wherein the secondary validation information is stored on one or more of the N storage mediums in association with one or more data chunks other than the first data chunk.

15. The system of claim 12, wherein examining the secondary validation information, in response to not being able to validate the first data chunk based on the first validation information, comprises:
the controller examining N−1 validation information in the first validation appendix against the corresponding other N−1 data chunks to determine whether the first data chunk is valid.

16. The system of claim 12, wherein examining the secondary validation information, in response to not being able to validate the first data chunk based on the first validation information, comprises:
the controller examining a second validation appendix including second validation information associated with a second data chunk to determine whether the first data chunk is valid.

17. The system of claim 12, further comprising:
in response to determining that the first data chunk is invalid, the controller reconstructing the first data chunk based on the recovery information in the recovery chunk and based on the value of the other N−1 data chunks.

18. The system of claim 12, further comprising:
in response to determining that the first data chunk is valid, the controller updating the recovery chunk based on the collective value of the N data chunks.

19. The system of claim 12, further comprising:
in response to determining that the first data chunk is valid, the controller updating the validation information in the first validation appendix based on the corresponding values of the N data chunks.

20. The system of claim 12, wherein the recovery information is usable to reconstruct one or more of said N data chunks.

21. The system of claim 12 wherein the recovery chunk is one of a plurality of recovery chunks.

22. The system of claim 21, wherein examining the secondary validation information, in response to not being able to validate the first data chunk based on the first validation information, comprises:
the controller examining a second validation information associated with a second recovery chunk to determine whether the first data chunk is valid.

23. A computer program product comprising a non-transient computer readable storage medium having a computer readable program stored thereon, wherein execution of the computer readable program on a computer causes the computer to:
receive a request for performing an operation on a first data chunk from among N data chunks respectively written across N storage mediums,
wherein a recovery chunk recorded on a second storage medium independent of said N storage mediums is associated with said N data chunks such that recovery information included in said recovery chunk is calculated based on collective value of data stored in said N data chunks,
wherein the recovery chunk is associated with a first validation appendix comprising a set of N validation information, wherein each of the N validation information corresponds to one of the N data chunks and each validation information is usable to independently validate the respective data chunk;
attempt to validate the first data chunk based on first validation information associated with the first data chunk; and
in response to not being able to validate the first data chunk based on the first validation information, examine secondary validation information associated with one or more data chunks other than the first data chunk to determine whether the first data chunk is valid.

24. The computer program product of claim 23, wherein the secondary validation information is stored in the first validation appendix on the second storage medium in association with the recovery chunk.

25. The computer program product of claim 23, wherein the secondary validation information is stored on one or more of the N storage mediums in association with one or more data chunks other than the first data chunk.

26. The computer program product of claim 23, wherein examining the secondary validation information, in response to not being able to validate the first data chunk based on the first validation information, further comprises:
examining N−1 validation information in the first validation appendix against the corresponding other N−1 data chunks to determine whether the first data chunk is valid.

27. The computer program product of claim 23, wherein examining the secondary validation information, in response to not being able to validate the first data chunk based on the first validation information, further comprises:
examining a second validation appendix including second validation information associated with a second data chunk to determine whether the first data chunk is valid.

28. The computer program product of claim 23, wherein the computer readable program when executed on a computes further causes that computer to:
reconstruct the first data chunk based on the recovery information in the recovery chunk and based on the value of the other N−1 data chunks, in response to determining that the first data chunk is invalid.

29. The computer program product of claim 23, wherein the computer readable program when executed on a computes further causes that computer to:
update the recovery chunk based on the collective value of the N data chunks, in response to determining that the first data chunk is valid.

30. The computer program product of claim 23, wherein the computer readable program when executed on a computes further causes that computer to:
update the validation information in the first validation appendix based on the corresponding values of the N data chunks, in response to determining that the first data chunk is valid.

* * * * *